Patented May 11, 1937

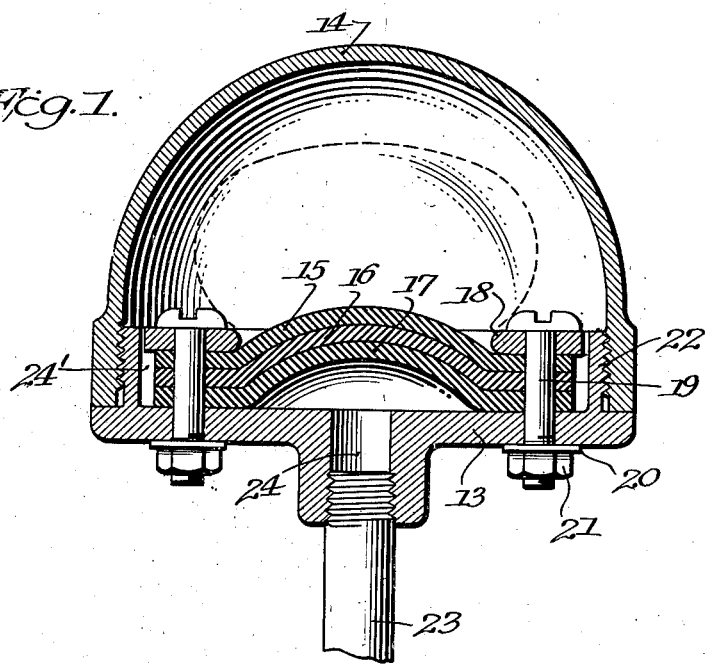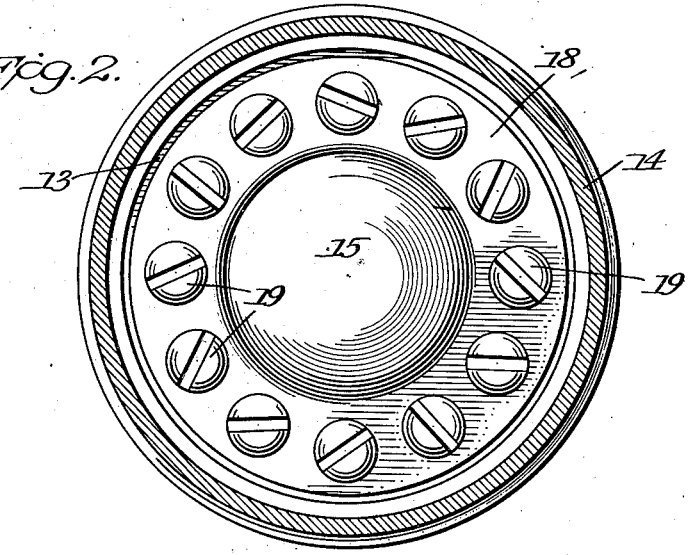

2,079,829

UNITED STATES PATENT OFFICE 2,079,829

PRESSURE HAMMER ABSORBER

Anton J. Zoeller, West New York, N. J.

Application June 29, 1936, Serial No. 88,053

6 Claims. (Cl. 138—30)

This invention relates to absorbers designed to take care of pressure hammer in pressure supply pipes for supply systems.

It is of the diaphragm type and has for its object the provision of an absorber in which the expansion of the diaphragm under pressure or hammer will not be unduly retarded, and, further, in event of leakage or rupture of the diaphragm, that will be at once indicated, and necessary repairs can be made.

The absorber which I have developed comprises two housing sections adapted to be connected into a pressure line and between which a diaphragm is secured and within which it will function, provision being made, preferably at the joint between the two sections of the housing, to permit leakage of air and to indicate or signal by seepage of fluid any rupture or disturbance of the diaphragm, indicating that it is not functioning properly.

In the drawing herewith is illustrated one form of the invention, and in said drawing:

Figure 1 is a side sectional view of the pressure hammer absorber, and

Figure 2 is a top sectional view thereof.

Referring to the drawing, the absorber comprises a diaphragm supporting base 13 and an enclosing cap 14. These two elements form a closed chamber enclosing a diaphragm. In the preferred embodiment, and as illustrated in Figure 1, I provide three superposed diaphragm sections 15, 16, and 17 of disc-like formation which are clamped or adequately secured to the base 13 in water-tight relation thereto.

The diaphragm sections are clamped to the base by a compression ring or follower 18 which engages the periphery of the topmost diaphragm section 15 and a plurality of bolts 19 passing through openings in the compression ring, diaphragm sections, and base. Suitable washers and nuts 20 and 21 are applied to the projecting portions of the bolts and are screwed thereon sufficiently to provide a water-tight joint between the base and the diaphragm.

The base 13 is provided with an upstanding annular flange 22 which is exteriorly screw-threaded. The enclosing cap 14, preferably of semi-spherical design, is formed adjacent its lower edges with interior threads which cooperate with the threads of the flange 22 to form a joint between the base and the cap. These threaded portions, however, are so formed as to permit a slow leak of air or seepage of water through the joint.

Assuming that the pressure hammer absorber is connected in the pipe line of a water supply system and that the pressure of the water is transmitted to the diaphragm by means of the branch pipe 23 and the opening 24 in the base 13, any excessive or sudden pressure will actuate the diaphragm, causing it to expand. Normally, the diaphragm sections 15 to 17 will lie slack, and will ordinarily not expand under pressure beyond the position shown in the drawing. If the threaded connections between the cap and the base were entirely water and air-tight, the air within the housing would be compressed every time the diaphragm expanded and would have the effect of retarding the expansion of the diaphragm and thereby destroy the effectiveness of the device. With a joint between the base and housing as described, there will be sufficient clearance, without undue looseness, to prevent compression or vacuum in the cap. Furthermore, if a pressure sufficient to burst or rupture the diaphragm occurred or caused a leak past the diaphragm, there would be no way of immediately ascertaining this fact, if the threaded joint was entirely water tight. By the present arrangement, however, if this abnormal condition ever arises and water enters the housing section 14, there would be a slow seepage of the water through the threaded connection between the base and the cap, thereby constituting a signal to indicate that the diaphragm had ruptured or a leak had developed. It is to be understood that any leakage which may occur would not be rapid enough to cause damage to the surroundings, but would merely be sufficient to give a signal or warning.

With my arrangement of mounting the diaphragm in the housing independently of the joint, I further provide other advantageous features. The compression ring 18 clamps the peripheral portions of the diaphragm sections inwardly of the walls of the housing and thereby permits lateral expansion of the diaphragm within the cap and beyond the inner edge of the compression ring, in the event that excessive pressure is encountered, as shown in dotted lines in Figure 1, said cap being of sufficient size to permit lateral expansion or bulging of the diaphragm. This has the advantage of permitting abnormal expansion of the diaphragm without, in ordinary use, permitting any rubbing contact between the diaphragm and the cap, which would tend to wear the diaphragm or weaken it to such an extent that it might rupture.

It will be observed that the outer peripheral edge of the compression ring 18 not only overlies the peripheral edges of the diaphragm sections, but extends somewhat beyond these edges. As shown in Figure 1, the outer edge of the ring is in close proximity to the inner wall of the flange 22, while the peripheral edges of the diaphragm sections are spaced from this flange to a greater degree, so that an expansion space 24' is provided for the diaphragm. This permits the diaphragm to expand under the pressure exerted by the follower and the diaphragm bolts without danger of disturbing the sealing contact between the base and diaphragm.

While I have shown my device as including three diaphragm sections, it is to be understood that any number of sections may be utilized as desired. In the present instance I have found that the three sections are of sufficient strength to withstand the usual city pressure and at the same time are responsive to and effective in reducing rapid increase in pressure.

While I have shown a particular construction, it will be understood that it may be varied within the range of mechanical skill without departing from my invention.

I claim:—

1. A pressure hammer absorber for pressure supply pipes, comprising a diaphragm-supporting base, a pressure connection to said base, a flexible diaphragm mounted on said base and enclosing said pressure connection, means for securing said diaphragm to said base in fluid-tight relation, a cap enclosing said diaphragm and its securing means, and independent means for securing said cap to said base, said means forming a substantially tight joint to prevent flooding but being of sufficient looseness to permit seepage of air and water to indicate rupture of the diaphragm.

2. A pressure hammer absorber for pressure supply pipes comprising a diaphragm-supporting base, a pressure connection to said base, a flexible diaphragm mounted on said base and enclosing said pressure connection, means for securing said diaphragm to said base in fluid-tight relation, a cap enclosing said diaphragm and its securing means, and a threaded connection between said cap and base and forming a substantially tight joint to prevent flooding but being of sufficient looseness to permit seepage of air and water to indicate rupture of the diaphragm.

3. A pressure hammer absorber for pressure supply pipes comprising a diaphragm-supporting base, a pressure connection to said base, a flexible disc-like diaphragm mounted on said base and enclosing said pressure connection, means for securing said diaphragm to said base in fluid-tight relation comprising a compression ring engaging the peripheral portions of the diaphragm and bolts passing through said ring, diaphragm and base, and a cap secured to said base exteriorly of said diaphragm and its securing means and enclosing and permitting lateral expansion of the diaphragm beyond the inner edge of the compression ring.

4. A pressure hammer absorber for pressure supply pipes comprising a diaphragm-supporting base, a pressure connection to said base, a plurality of superposed disc-like diaphragm sections mounted on said base and enclosing said pressure connection, means for securing said diaphragm sections to said base in fluid-tight relation comprising a compression ring engaging the peripheral portions of the top section and bolts passing through said ring, diaphragm sections and base, a cap enclosing said diaphragm sections and their securing means, and a threaded connection between said cap and base and forming a substantially tight joint to prevent flooding but being of sufficient looseness to permit seepage of air and water to indicate rupture of the diaphragm.

5. A pressure hammer absorber for pressure supply pipes comprising a diaphragm-supporting base, a pressure connection to said base, a flexible disc-like diaphragm mounted on said base and enclosing said pressure connection, a cap secured to said base and forming therewith a diaphragm housing, and means for securing said diaphragm to the base in water-tight relation thereto including a compression ring overlying the diaphragm with its outer peripheral edge projecting beyond the peripheral edge of the diaphragm and in close proximity to the inner wall of the housing.

6. A pressure hammer absorber for pressure supply pipes comprising a diaphragm supporting base, a pressure connection to said base, a flexible disc-like diaphragm mounted on said base and enclosing said pressure connection, means for securing said diaphragm to said base in fluid-tight relation, a cap enclosing said diaphragm and its securing means, and a threaded connection between said cap and base and forming a substantially tight joint to prevent flooding but being of sufficient looseness to permit seepage of air and water to indicate rupture of the diaphragm.

ANTON J. ZOELLER.